US012641258B2

(12) United States Patent
Francois et al.

(10) Patent No.: US 12,641,258 B2
(45) Date of Patent: May 26, 2026

(54) ADAPTING LUMA MAPPING WITH CHROMA SCALING TO 4:4:4 RGB IMAGE CONTENT

(71) Applicant: InterDigital CE Patent Holdings, SAS, Paris (FR)

(72) Inventors: Edouard Francois, Bourg des Comptes (FR); Franck Hiron, Chateaubourg (FR); Christophe Chevance, Brece (FR); Remi Jullian, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 12 days.

(21) Appl. No.: 18/268,142

(22) PCT Filed: Dec. 3, 2021

(86) PCT No.: PCT/EP2021/084273
§ 371 (c)(1),
(2) Date: Jun. 16, 2023

(87) PCT Pub. No.: WO2022/128549
PCT Pub. Date: Jun. 23, 2022

(65) Prior Publication Data
US 2024/0195991 A1 Jun. 13, 2024

(30) Foreign Application Priority Data
Dec. 18, 2020 (EP) ..................................... 20306616

(51) Int. Cl.
*H04N 19/186* (2014.01)
*H04N 19/12* (2014.01)
(Continued)

(52) U.S. Cl.
CPC .......... *H04N 19/186* (2014.11); *H04N 19/12* (2014.11); *H04N 19/136* (2014.11); *H04N 19/70* (2014.11)

(58) Field of Classification Search
CPC ...... H04N 19/12; H04N 19/70; H04N 19/136; H04N 19/186
(Continued)

(56) References Cited

U.S. PATENT DOCUMENTS

2020/0296398 A1* 9/2020 Zhao ..................... H04N 19/124
2021/0076079 A1* 3/2021 Lu .......................... H04N 19/33
(Continued)

FOREIGN PATENT DOCUMENTS

WO WO-2020224629 A1 * 11/2020 ........... H04N 19/157

OTHER PUBLICATIONS

Francois et al., Signalling, Backward Compatibility, and Display Adaptation for HDR/WCG Video Draft 1, Joint Collaborative Team on Video Coding (JCT-VC) of ITU-T SG 16 WP 3 and ISO/IEC JTC 1/SC 29/WG 11, Document: JCTVC-Y1012-v2, 25th Meeting, Chengdu, China, Oct. 14, 2016, 30 pages.
(Continued)

*Primary Examiner* — Albert Kir
(74) *Attorney, Agent, or Firm* — Condo Roccia Koptiw LLP

(57) ABSTRACT
At least a method and an apparatus are presented for efficiently encoding or decoding video by adapting Luma mapping with Chroma scaling for 4:4:4 RGB content. For example, a format of an image data of a video to encode is determined to be RGB format; and responsively a RGB mapping is applied to at least one of the color components of the image data wherein a RGB mapping adjusts the dynamic range of a color component of an image data in
(Continued)

RGB format. Then, the video is encoded based on the at least one RGB mapped color component.

17 Claims, 9 Drawing Sheets

(51) Int. Cl.
    *H04N 19/136*          (2014.01)
    *H04N 19/70*           (2014.01)

(58) Field of Classification Search
    USPC ..................................................... 375/240.02
    See application file for complete search history.

(56)                  References Cited

U.S. PATENT DOCUMENTS

| | | | | |
|---|---|---|---|---|
| 2021/0120253 | A1* | 4/2021 | Topiwala | H04N 19/186 |
| 2021/0400257 | A1* | 12/2021 | Zhao | H04N 19/136 |
| 2021/0409683 | A1* | 12/2021 | Chen | H04N 19/136 |
| 2022/0038693 | A1* | 2/2022 | Zhang | H04N 19/176 |
| 2023/0109849 | A1* | 4/2023 | Xiu | H04N 19/132 |
| | | | | 375/240.03 |
| 2023/0421771 | A1* | 12/2023 | Li | H04N 19/46 |
| 2024/0397045 | A1* | 11/2024 | Iwamura | H04N 19/119 |

OTHER PUBLICATIONS

Francois et al., "AHG14: Evaluation of SDR quality from backward compatible HDR video technologies", Joint Collaborative Team on Video Coding (JCT-VC) of ITU-T SG 16 WP 3 and ISO/IEC JTC 1/SC 29/WG 11, Document: JCTVC-Z0024, 26th Meeting, Geneva, Switzerland, Jan. 12, 2017, 10 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, 12 pages.

Browne et al., "Common test conditions for high bit depth and high bit rate video coding", Joint Video Experts Team (JVET) of ITU-T SG 16 WP 3 and ISO/IEC JTC 1/SC 29, Document: JVET-T2018, 20th Meeting: by teleconference, Oct. 7, 2020, 6 pages.

Francois et al., "AHG14: Evaluation of SDR quality from backward compatible HDR video technologies", Joint Collaborative Team on Video Coding (JCT-VC) of ITU-T SG 16 WP 3 and ISO/IEC JTC 1/SC 29/WG 11, Document: JCTVC-Z0024 Presentation, 26th Meeting, Geneva, Switzerland, Jan. 12, 2017, 10 pages.

Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

Anonymous, "Series H: Audiovisual and Multimedia Systems, Infrastructure of audiovisual services—Coding of moving video—Versatile video coding", International Telecommunication Union, ITU-T Telecommunication Standardization Sector of ITU, Recommendation ITU-T H.266, Aug. 2020, 516 pages.

Chen et al., "Algorithm description for Versatile Video Coding and Test Model 11(VTM 11)", Joint Video Experts Team (JVET) of ITU-T SG 16 WP 3 and ISO/IEC JTC 1/SC 29, Document: JVET-T2002-v1, 20th Meeting, by teleconference, Oct. 7, 2020, 102 pages.

Francois et al., "AHG7/AHG15: signalling of corrective values for chroma residual scaling", Joint Video Experts Team (JVET) of ITU-T SG 16 WP 3 and ISO/IEC JTC 1/SC 29/WG 11, Document: JVET-P0371r1, 16th Meeting, Geneva, Switzerland, Oct. 1, 2019, 7 pages.

ITU, "Versatile video coding", Series H: Audiovisual and Multimedia Systems Infrastructure of audiovisual services—Coding of moving video, ITU-T H.266, Aug. 2020, 516 pages.

* cited by examiner

ADAPTING LUMA MAPPING WITH CHROMA SCALING TO 4:4:4 RGB IMAGE CONTENT

CROSS REFERENCE TO RELATED APPLICATIONS

This application is a U.S. National Stage Application under 35 U.S.C. § 371 of International Patent Application No. PCT/EP2021/084273, filed Dec. 3, 2021, which is incorporated herein by reference in its entirety.

This application claims priority to European Application No. 20306616.2, filed Dec. 18, 2020, which is incorporated herein by reference in its entirety.

TECHNICAL FIELD

At least one of the present embodiments generally relates to a method or an apparatus for video encoding or decoding, and more particularly, to a method or an apparatus wherein a RGB mapping, adjusting the dynamic range of samples of an image data in RGB format, is applied to at least one RGB color component.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

Existing methods for coding and decoding specifies a tool for Luma Mapping with Chroma Scaling (LMCS) designed to process YUV (also noted YCbCr) content, with luma mapping applying to the Y component, and chroma residual scaling applying to the U and V components. However, LMCS is not adapted to RGB content. Therefore, there is a need to improve the state of the art to achieve better coding efficiency.

SUMMARY

The drawbacks and disadvantages of the prior art are solved and addressed by the general aspects described herein.

According to a first aspect, there is provided a method. The method comprises video decoding by determining that a format of an image data of a video to decode is RGB format; responsively applying an inverse RGB mapping to at least one of the color components of the image data wherein a RGB mapping adjusts the dynamic range of a color component of an image data in RGB format; and decoding the video based on the at least on inverse RGB mapped color component.

According to another aspect, there is provided a second method. The method comprises video encoding by determining that a format of an image data of a video to encode is RGB format; responsively applying a RGB mapping to at least one of the color components of the image data wherein a RGB mapping adjusts the dynamic range of a color component of an image data in RGB format; and encoding the video based on the at least one RGB mapped color component.

According to another aspect, there is provided an apparatus. The apparatus comprises one or more processors, wherein the one or more processors are configured to implement the method for video decoding according to any of its variants. According to another aspect, the apparatus for video decoding comprises means for determining that a format of an image data of a video to decode is RGB format; means for applying an inverse RGB mapping to at least one of the color components of the image data wherein a RGB mapping adjusts the dynamic range of a color component of an image data in RGB format; and means for decoding the video based on the at least on inverse RGB mapped color component.

According to another aspect, there is provided another apparatus. The apparatus comprises one or more processors, wherein the one or more processors are configured to implement the method for video encoding according to any of its variants. According to another aspect, the apparatus for video encoding comprises means determining that a format of an image data of a video to encode is RGB format; means for applying a RGB mapping to at least one of the color components of the image data wherein a RGB mapping adjusts the dynamic range of a color component of an image data in RGB format; and means for encoding the video based on the at least one RGB mapped color component.

According to another general aspect of at least one embodiment, the RGB mapping is a luma mapping used to adjust the dynamic range of the luminance color component of an image data in YUV format.

According to another general aspect of at least one embodiment, the RGB mapping is applied to all of the color components of the image data According to another general aspect of at least one embodiment, at least one syntax data element is signaled that specifies the RGB mapping is enabled for one of the color components and RGB mapping is applied to the color component according to the syntax data element specifying whether the RGB mapping is enabled for this color component.

According to another general aspect of at least one embodiment, at least one syntax data element is signaled that specifies whether a single RGB mapping is defined for all of the color components or a plurality of color component RGB mapping are defined, a color component RGB mapping being defined for one of the color components, and the RGB mapping is applied to at least one color component according to the syntax data element specifying whether a single RGB mapping or a plurality of color component RGB mappings are defined.

According to another general aspect of at least one embodiment, at least one syntax data element is signaled that specifies RGB mapping parameters representative of a slope of a RGB mapping for one of the color components and RGB mapping is applied to a color component according to the RGB mapping parameters for this color component.

According to another general aspect of at least one embodiment, an adaptive color transform is applied to the image data resulting into differential color components and a chroma residual scaling is applied to the differential color components (Cg, Co) of the image data wherein a chroma residual scaling adjusts the dynamic range of a differential component of an image data.

According to another general aspect of at least one embodiment, at least one syntax data element specifying that RGB mapping is enabled for one of the color components, or at least one syntax data element specifying whether a single RGB mapping or a plurality of color component RGB mapping are defined, or at least one syntax data element specifying RGB mapping parameters are signaled in one of a slice, a Picture Parameter Set (PPS), a Sequence Parameter Set (SPS), an Adaptation Parameter Set (APS).

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

In the drawings, examples of several embodiments are illustrated.

DETAILED DESCRIPTION

Figure 1:
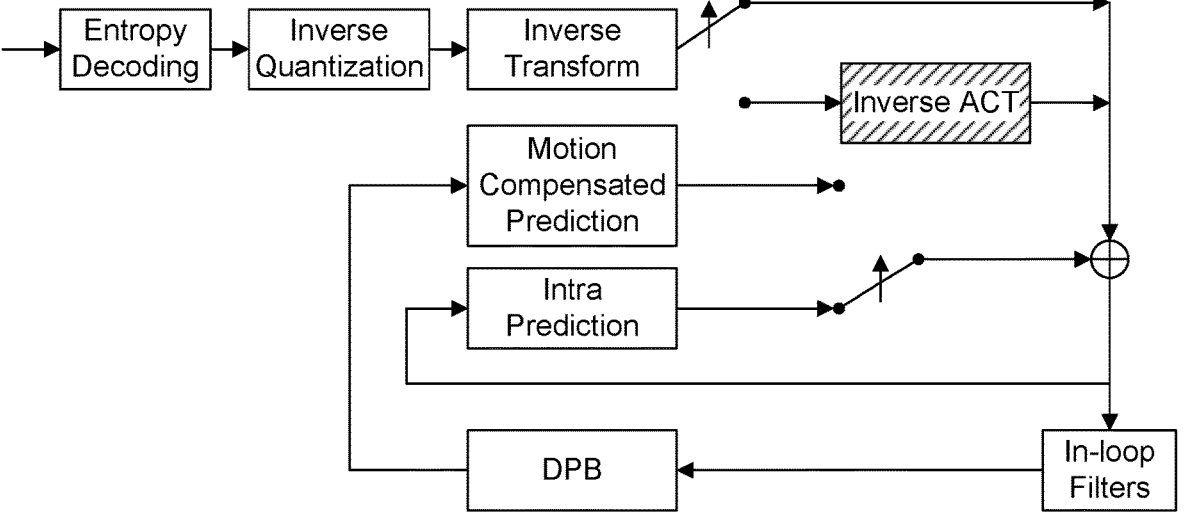
FIG. 1 illustrates an inverse adaptive color transform in a block diagram of an embodiment of video decoder.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of an image. They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to method for encoding or decoding a video wherein a RGB mapping, adjusting the dynamic range of samples of an image data in RGB format, is applied to at least one RGB color component.

Luma mapping with Chroma scaling (LMCS) is a tool of VVC. It includes two aspects: luma mapping (LM), and luma-dependent chroma residual scaling (CS, or as noted in the current application, CRS).

The luma mapping adjusts the dynamic range of an input luma signal to improve compression efficiency. The luma mapping reshapes the codewords across the dynamic range. It is particularly well adapted to high bit depth (such as HDR 10 bits, 12 bits, 14 bits from BT2100) signal but can also improve rate distortion for both SDR and HDR signal. The luma signal is one color component of image in an YUV format that defines a color space in terms of one luma component (Y) and two chrominance components (UV). The luma mapping is defined with an adaptive piecewise linear model. At the decoder, Luma mapping comprises applying a luma forward mapping function $Map_{fwd}(\cdot)$ to the temporal prediction luma samples. Prior to the in-loop filtering step of the decoder, an inverse luma mapping is applied to go back to the original (non-mapped) signal domain. The luma forward mapping function $Map_{fwd}(\cdot)$ is based on a table lumaMapTable coded in the stream, where lumaMapTable indicates the slopes of the piece-wise linear luma mapping function $Map_{fwd}(\cdot)$. Each piece or segment is of uniform length, defined for an interval $[Y_i, Y_{i+1}-1]$, $i=0$ to 15. The inverse luma mapping function is also derived from this table.

Luma-dependent chroma residual scaling is applied to chroma components and compensates for the interaction between the luma signal and its corresponding chroma signals, the scaling factor depends on the reconstructed neighbouring Luma samples.

CRS comprises using a luma-dependent scaling (encoder) or inverse scaling (encoder and decoder). The inverse scaling factors are derived from a table, chromaScaleTable, indexed by luma values. chromaScaleTable is deduced from lumaMapTable and can be approximated as chromaScaleTable[i]=1/lumaMapTable[i], for i=0 to 15. The scaling factors at the encoder side are the inverse of the inverse scaling factor used at the decoder. When processing a chroma block, a CRS factor for each 64×64 luma block (called Video Processing Decoding Unit—VPDU) is derived from luma sample values from previously reconstructed VPDU neighbors. For each VPDU, the left and top neighboring reconstructed luma samples are used. First, the average value of M left neighboring luma samples and M top neighboring luma samples which are the closest to the top-left position, avgY, is calculated. M=min(CTUSize, 64). Then the chroma scaling (encoder) or inverse scaling (encoder and decoder) factor is derived from the chroma scaling table based on avgY.

This process can be represented by the following simplified formula:

$$scale=scalingTable[avgY]$$

where scalingTable is a LUT derived from chromaScaleTable.

The luma mapping works as follows. At the encoder, the residual signal before quantization, Res_source, is generated according to the following formula:

$$Res\_source(p)=map[Orig(p)]-map[Pred(p)] \quad (eq.\ 1)$$

where Orig(p) is the value of the source sample (to be coded) at location p(x,y) in the picture, Pred(p) is the value of the prediction sample, and Res_source(p) is the value of the prediction residual sample before quantization, map[.] is the reshaping function.

Res_source(p) is then transformed, quantized. The inverse quantized and inverse transformed residual signal is noted Res(p).

At the decoder, the signal is reconstructed according to the following formula:

$$Rec(p)=invmap[map[Pred(p)]+Res(p)](eq.\ 2)$$

where Rec(p) is the value of the reconstructed sample, invmap[.] is the inverse reshaping function (inverse of map[.] such that invmap[map[x] ]=x).

LMCS parameters are signalled in the Adaptive Parameter Set (APS), using the following syntax.

TABLE 1

LMCS syntax table

| | Descriptor |
|---|---|
| lmcs_data( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] > 0 ) | |
|       lmcs_delta_sign_cw_flag[ i ] | u(1) |
|   } | |

6

TABLE 1-continued

LMCS syntax table

| | Descriptor |
|---|---|
|   if( aps_chroma_present_flag ) { | |
|     lmcs_delta_abs_crs | u(3) |
|     if( lmcs_delta_abs_crs > 0 ) | |
|       lmcs_delta_sign_crs_flag | u(1) |
|   } | |
| } | |

Besides, VVC defines a mode called «Adaptive Color Transform" (ACT) that applies for 4:4:4 RGB video content. ACT consists in a color space conversion of the prediction residual.

FIG. 1 illustrates an inverse adaptive color transform in a block diagram of an embodiment of video decoder. ACT applies at the encoder on the prediction residual before applying the transform (step 119 of FIG. 2). It transforms the input RGB samples into three samples noted YCgCo where Y is similar to a luma signal, while Cg and Co are differential chroma signals. ACT applies to the RGB residue samples as follows:

$$\begin{bmatrix} Y \\ Cg \\ Co \end{bmatrix} = \begin{bmatrix} 2 & 1 & 1 \\ 2 & -1 & -1 \\ 0 & -2 & 2 \end{bmatrix} \cdot \begin{bmatrix} G \\ B \\ R \end{bmatrix} \Big/ 4$$

Inverse ACT applies at the encoder (step 120) and at the decoder (step 214) after the inverse transform to the decoded residual. The ACT applies to the YCgCo residue samples as follows:

$$\begin{bmatrix} G \\ B \\ R \end{bmatrix} = \begin{bmatrix} 1 & 1 & 0 \\ 1 & -1 & -1 \\ 1 & -1 & 1 \end{bmatrix} \cdot \begin{bmatrix} Y \\ Cg \\ Co \end{bmatrix}$$

A CU flag is signalled to select or not ACT. ACT mode is disabled in Dual Tree mode or when Intra Sub-partitioning mode is used. It is only enabled if at least one non-zero coefficient is present in the CU.

Figure 2:
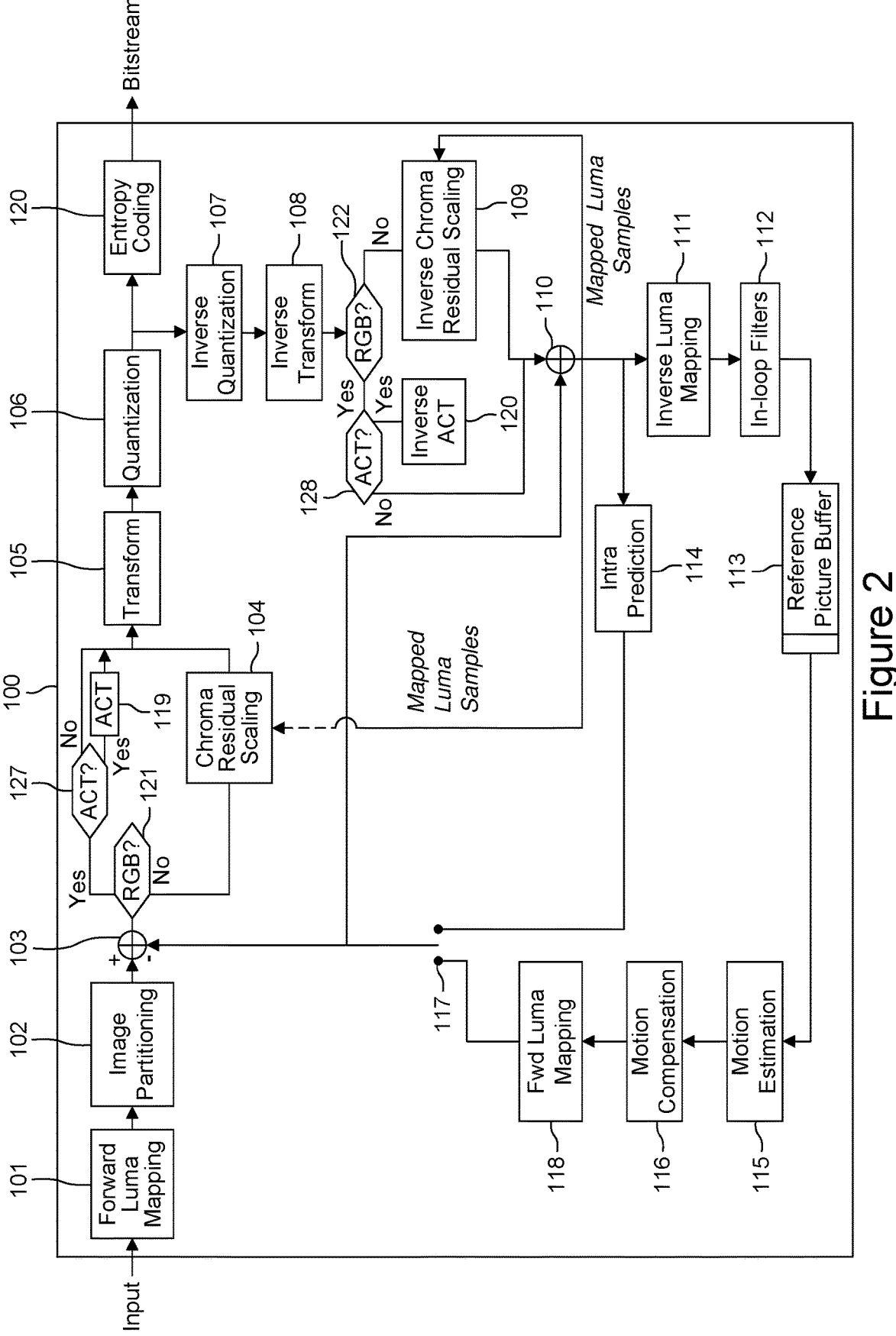
FIG. 2 illustrates a block diagram of an embodiment of WC video encoder in which various aspects of the embodiments may be implemented.

FIG. 2 illustrates a block diagram of an embodiment of VVC video encoder in which various aspects of the embodiments may be implemented.

In the encoder 100, a picture is encoded by the encoder elements as described below. The input YUV signals is processed by a forward luma mapping (101). The picture to be encoded is processed in units of CUs (102). Each CU is encoded using either an intra or inter mode. When a CU is encoded in an intra mode, it performs intra prediction (114). In an inter mode, motion estimation (115) and compensation (116) are performed. The forward mapping (118) is applied to the predicted signals. The encoder decides (117) which one of the intra mode or inter mode to use for encoding the CU, and indicates the intra/inter decision by a prediction mode flag. Prediction residuals are calculated by subtracting (103) the forward mapped predicted block (from output of 118) from the processed original image block, e.g. from the mapped original image block (from output of 101).

The prediction residuals are then either processed by the chroma residual scaling (104) when chroma format is not RGB (121) or by the Adaptive color transform (ACT) (119) when chroma format is RGB (121) and ACT mode is enabled (127). The resulting prediction residuals are then transformed (105) and quantized (106). The quantized transform coefficients, as well as motion vectors and other syntax elements, are entropy coded (120) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied, and the coding unit samples are directly coded into the bitstream.

The encoder decodes an encoded block to provide a reference for further predictions. The quantized transform coefficients are de-quantized (107) and inverse transformed (108) to decode prediction residuals. The decoded residuals are then either processed by the inverse chroma residual scaling (109) when chroma format is not RGB (122) or the inverse ACT (120) when chroma format is RGB (122) and ACT mode is enabled (128). Combining (110) the resulting residuals and the predicted block, an image block is reconstructed. Inverse luma mapping (111) and in-loop filters (112) are applied to the reconstructed signal, for example, to perform deblocking/SAO (Sample Adaptive Offset)/ALF (Adaptive loop filter) filtering to reduce encoding artifacts. The filtered image is stored at a reference picture buffer (113).

Figure 3:
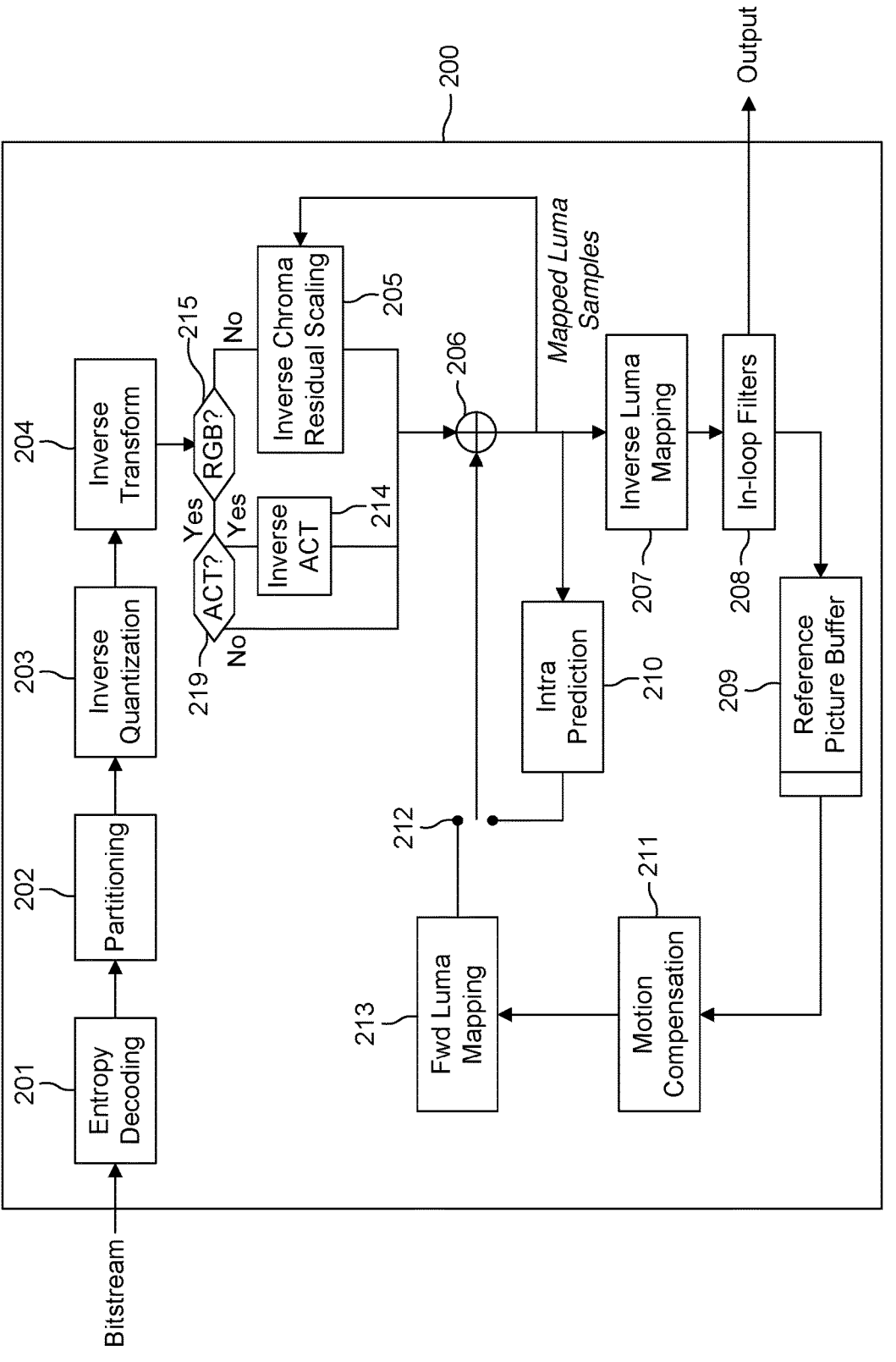
FIG. 3 illustrates a block diagram of an embodiment of WC video decoder in which various aspects of the embodiments may be implemented.

FIG. 3 illustrates a block diagram of an embodiment of VVC video decoder in which various aspects of the embodiments may be implemented.

In the decoder 200, a bitstream is decoded by the decoder elements as described below. Video decoder 200 generally performs a decoding pass reciprocal to the encoding pass as described in FIG. 2, which performs video decoding as part of encoding video data.

The input of the decoder includes a video bitstream, which may be generated by video encoder 100. The bitstream is first entropy decoded (201) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (202) the picture into CTUs, and each CTU into CUs, according to the decoded picture partitioning information. The transform coefficients are de-quantized (203) and inverse transformed (204) to decode the prediction residuals. The decoded residuals are then either processed by the inverse chroma residual scaling (205) when chroma format is not RGB (215) or the inverse ACT (214) when chroma format is RGB (215) and ACT mode is enabled (219).

Combining (206) the resulting residuals and the predicted block, an image block is reconstructed. The predicted block may be obtained (212) from intra prediction (210) or motion-compensated prediction (i.e., inter prediction) (211). Also, the forward luma mapping (213) is applied to the predicted signals. In case of bi-prediction, two motion compensated predictions may be combined with a weighted sum. Inverse luma mapping (207) and in-loop filters (208) are applied to the reconstructed signal. The filtered image is stored at a reference picture buffer (209).

The present application relates to the adaptation of LMCS for 4:4:4 RGB content. LMCS was designed to process YUV (also noted YCbCr) content, with luma mapping applying to the Y component, and chroma residual scaling applying to the U and V components. Common test condition simply suggests disabling LMCS for RGB content. This process is not adapted to RGB content. Indeed, Y, U and V components are of different nature. The Y component corresponds to the brightness of the signal, while U and V are differential components.

For instance, the conversion from RGB to YUV considering the BT.2020 color primaries is based on the following equations:

$$Y=0.2126*R+0.7152*G+0.0722*B$$

$$Cb=(B-Y)/1.8556$$

$$Cr=(R-Y)/1.5748$$

On the contrary R, G, and B are of same nature, and similar to brightness of each color. So, they are of same nature as the Y component. It is therefore desirable to adapt LMCS to properly handle RGB content.

This is solved and addressed by the general aspects described herein, which are directed to an encoding and decoding methods wherein a RGB mapping, that adjusts the dynamic range of samples of an image data in RGB format, is applied to at least one RGB color component. The present principles propose to adapt LMCS in case of RGB content according to the following two changes:

Luma Mapping is applied to the 3 color components;

Chroma residual scaling is applied in a CU when ACT mode is enabled for the CU, and applies to the chroma differential components (Cg, Co) of the decoded chroma residual signal.

For the luma mapping, different variants are proposed:

using the same mapping function for the 3 components;

using 3 different mapping functions for the 3 components.

The advantage of the proposed invention is to get a better coding efficiency when coding 4:4:4 RGB content. The codec modules that are affected are, 101, 104, 109, 111 and 118 in encoder of FIGS. 2, 205, 207 and 213 in decoder of FIG. 3.

Various embodiments of a generic encoding or decoding method comprising a modified mapping of color component are described in the following.

According to a first embodiment, when the content is in RGB format, a RGB mapping is applied to at least one of the color components R, G, B of content. In the first embodiment, the adaptive color transform is disabled. Different variants are disclosed.

Figure 4:
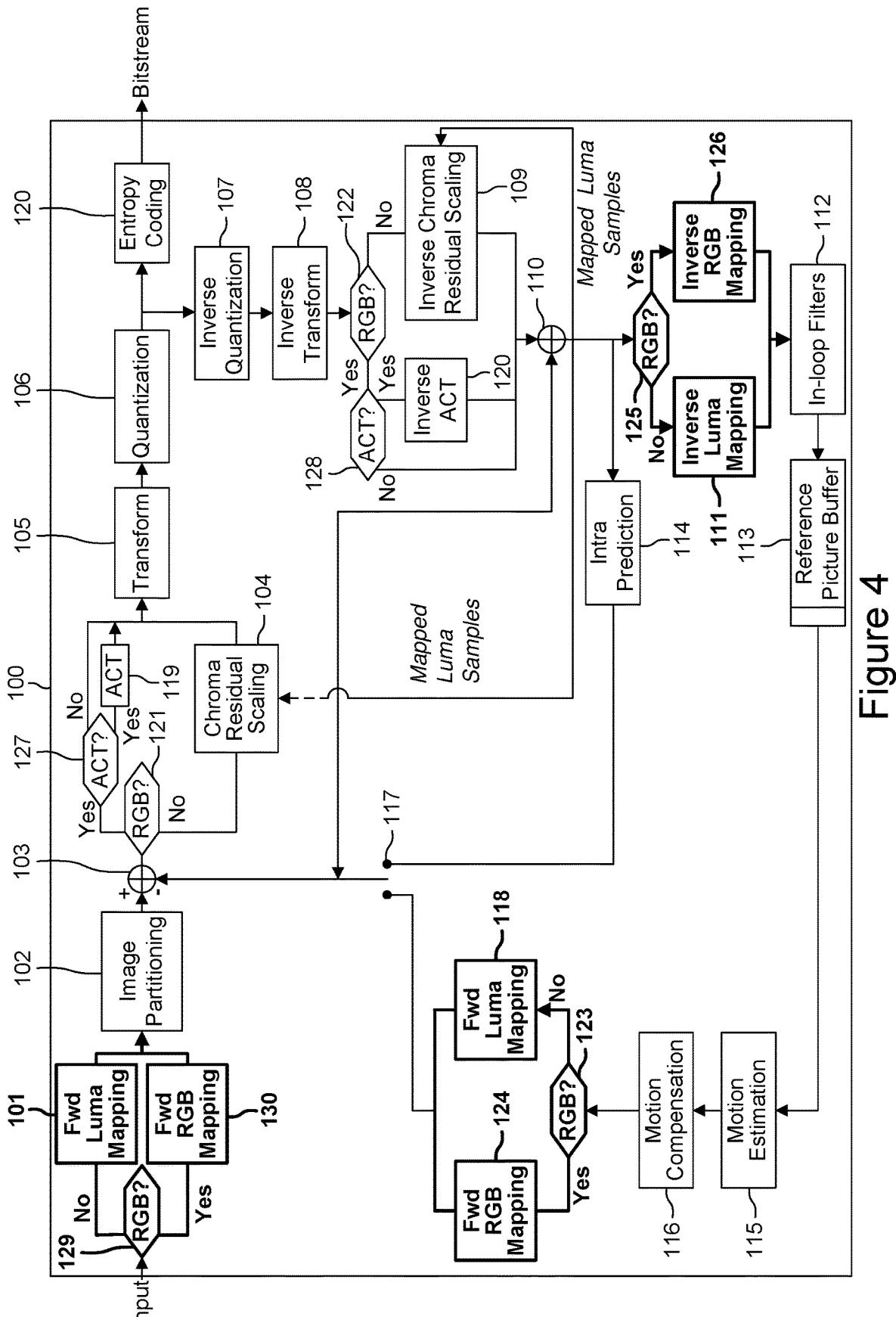
FIG. 4 illustrates a block diagram of an embodiment of video encoder with modified forward mapping and inverse mapping processes according to at least one embodiment.

FIG. 4 illustrates a block diagram of an embodiment of video encoder with modified forward mapping and inverse mapping processes according to the first embodiment. New or modified coding blocks and inter-block links are indicated in bold lines and bold rectangles with respect to the encoder of FIG. 2. The format (RGB or YUV) input signal is tested (129) and responsively the input signal either processed by the forward luma mapping (101) or by the forward RGB mapping (130) depending if the signal is YUV or RGB. The prediction signal, resulting from the reconstructed signal, is either processed by the forward luma mapping (118) or the forward RGB mapping (124) depending if the signal is YUV or RGB (checked in step 123). Similarly, in the decoding process of the encoding process, the reconstructed signal is either processed by the inverse luma mapping (111) or the inverse RGB mapping (126) depending if the signal is YUV or RGB (checked in step 125).

The way of testing if the signal is YUV or RGB is typically done in VVC as follows. If the signal is indicated to be in 4:4:4 format (using the syntax element sps_chroma_format_idc) and if the ACT mode is enabled (using the syntax element sps_act_enabled_flag), then the signal is considered to be RGB. Otherwise, it is considered to be YUV.

Figure 5:
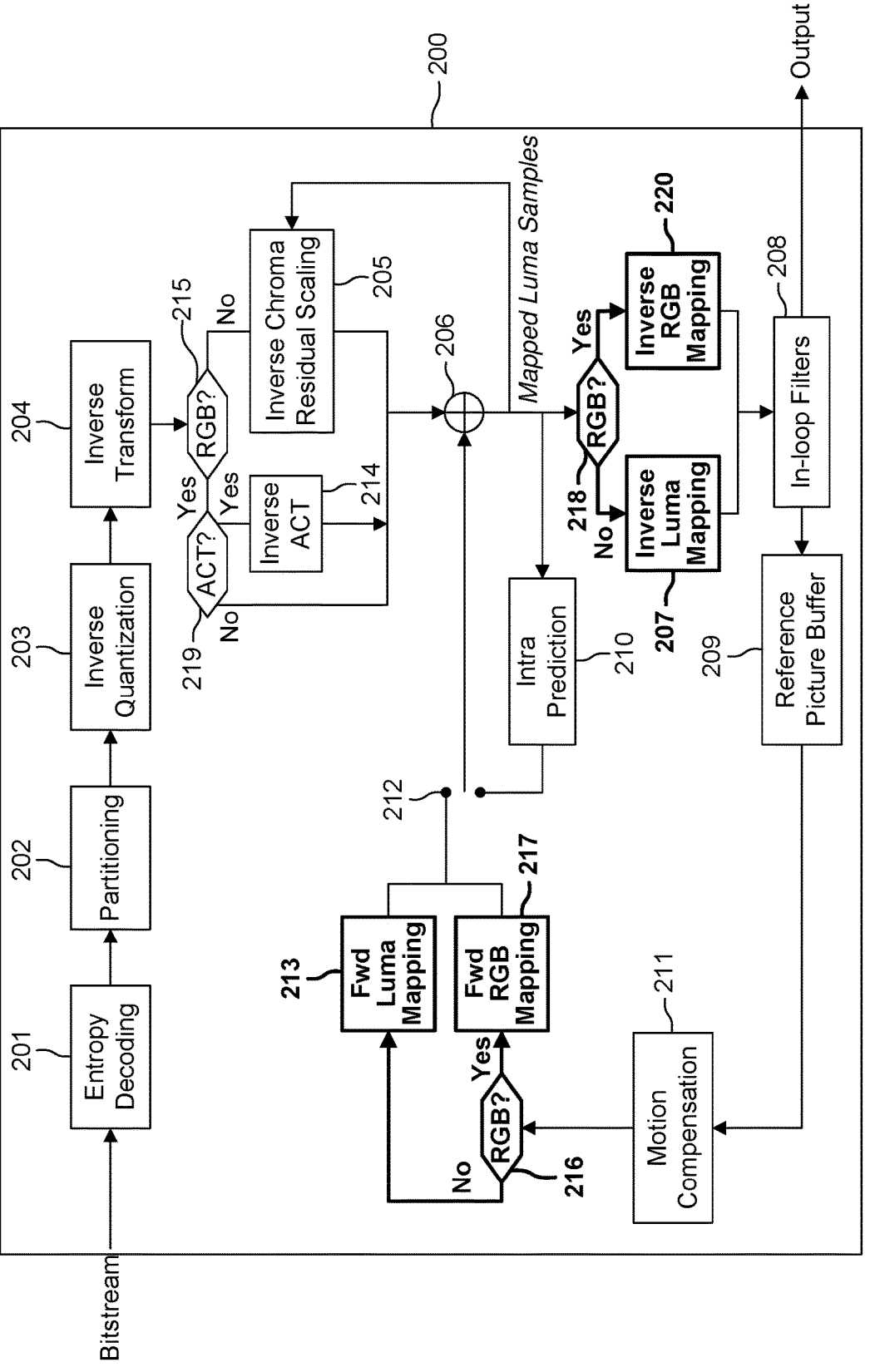
FIG. 5 illustrates a block diagram of an embodiment of video decoder with modified forward mapping and inverse mapping processes according to at least one embodiment.

FIG. 5 illustrates a block diagram of an embodiment of video decoder with modified forward mapping and inverse mapping processes according to at least one embodiment. New or modified coding blocks and inter-block links are indicated in bold lines and bold rectangles. The prediction signal is either processed by the forward luma mapping (213) or the forward RGB mapping (217) depending if the signal is YUV or RGB (checked in step 216). The reconstructed signal resulting from step 206 is either processed by the inverse luma mapping (207) or the inverse RGB mapping (219) depending if the signal is YUV or RGB (checked in step 218).

According to a first variant of the first embodiment, the same RGB mapping is applied to the 3 color components R, G and B. According to another variant, the mapping used for RGB format is the luma mapping used to adjust the dynamic range of the luminance color component in YUV format. Advantageously, no additional signaling is needed. For instance, the mapping is enabled or disabled according to the flag sps_lmcs_enabled_flag enabling the luma mapping of LMCS. However, this variant differs from the case of YUV format where the luma mapping only applies to the luma component samples Y. Besides, the mapping function is defined by the same syntax elements lmcs_delta_abs_cw[i] and lmcs_delta_sign_cw_flag[i] applied to the samples of the R, G and B color components. As a result, the LMCS syntax (lmcs_data( )) is not required to be modified.

In a second variant, the mapping is enabled or disabled per color component. The LMCS syntax (lmcs_data( )) is modified to enable controlling the mapping for each component, as depicted in the Table 2. The changes compared to the Table 1 are highlighted in grey. Up to 3 new syntax elements are added, lmcs_enable_flag[cIdx], cIdx=0 to 2, indicating if the mapping is applied or not for the color component of index cIdx.

TABLE 2

| modified LMCS syntax table. | |
| --- | --- |
| | Descriptor |
| lmcs_data( ) { | |
| if( sps_chroma_format_idc == 3 ) { | |
| lmcs_enable_flag[ 0 ] | u(1) |
| lmcs_enable_flag[ 1 ] | u(1) |
| lmcs_enable_flag[ 2 ] | u(1) |
| } | |

TABLE 2-continued

| modified LMCS syntax table. | |
| --- | --- |
| | Descriptor |
| lmcs_min_bin_idx | ue(v) |
| lmcs_delta_max_bin_idx | ue(v) |
| ... | | lmcs_enable_flag[cIdx] specifies that the luma mapping process applies to the color component if index cIdx. When not present, lmes_enable_flag[0] is set equal to 1. When not present, lmes_enable_flag[1] is set equal to 0. When not present, lmcs_enable_flag[2] is set equal to 0.

In a third variant, different mapping functions are used for the different color components. Accordingly, several mapping functions are signaled in the LMCS syntax (lmcs_data ( )), as depicted in Table 3. A first syntax element lmcs_multiple_models_flag is added to indicate if 1 or several mapping functions are used. When lmcs_multiple_models_flag is equal to 0, only one function is used. When lmcs_multiple_models_flag is equal to 1, up to 3 functions are used and signaled. The syntax elements related to the mapping functions are indexed by k which corresponds to the function number. k is equal to 0 when lmcs_multiple_models_flag is equal to 0 and goes from 0 to 2 when lmcs_multiple_models_flag is equal to 1.

TABLE 3

| Modified LMCS syntax table | |
| --- | --- |
| | Descriptor |
| lmcs_data( ) { | |
| if( sps_chroma_format_idc == 3 ) | |
| lmcs_multiple_models_flag | u(1) |
| for( k = 0; k <= 3 * lmcs_multiple_models_flag; k++ ) { | |
| lmcs_min_bin_idx[ k ] | ue(v) |
| lmcs_delta_max_bin_idx[ k ] | ue(v) |
| lmcs_delta_cw_prec_minus1[ k ] | ue(v) |
| for( i = lmcs_min_bin_idx[ k ]; i <= LmcsMaxBinIdx[ k ]; i++ ) { | |
| lmcs_delta_abs_cw[ k ] [ i ] | u(v) |
| if( lmcs_delta_abs_cw[ k ] [ i ] > 0 ) | |
| lmcs_delta_sign_cw_flag[ k ] [ i ] | u(1) |
| } | |
| } | |
| ... | |

The following logic can be applied and added in the specification for the case where 1 single function is used:

When lmes_min_bin_idx[1] and lmes_min_bin_idx[2] are not present, they are set equal to lmes_min_bin_idx [0].

The same logic can apply to the other syntax elements indexed by "k".

According to yet another variant, when several functions are used, the coding of the syntax elements of the second and third functions can be done using the syntax elements of the first function as reference. The coded values are for instance coded as the difference to the values of the syntax elements of the first function, which may allow reducing the overall coding cost of these syntax elements.

According to a fourth variant, the second and third variant are combined, to control the enabling/disabling of the mapping per component, and when mapping applies, signaling one single mapping function for all components, or one mapping function per component. Example syntax is shown in Table 4.

TABLE 4

| modified LMCS syntax table | |
|---|---|
| | Descriptor |
| lmcs_data( ) { | |
| if( sps_chroma_format_idc = = 3 ) { | |
| lmcs_enable_flag[ 0 ] | u(1) |
| lmcs_enable_flag[ 1 ] | u(1) |
| lmcs_enable_flag[ 2 ] | u(1) |
| lmcs_multiple_models_flag | u(1) |
| } | |
| for( k = 0; k <= 3 * lmcs_multiple_models_flag; k++ ) { | |
| if( lmcs_enable_flag[ k ] ) { | |
| lmcs_min_bin_idx[ k ] | ue(v) |
| lmcs_delta_max_bin_idx[ k ] | ue(v) |
| lmcs_delta_cw_prec_minus1[ k ] | ue(v) |
| for( i = lmcs_min_bin_idx[ k ]; i <= LmcsMaxBinIdx[ k ]; i++ ) { | |
| lmcs_delta_abs_cw[ k ] [ i ] | u(v) |
| if( lmcs_delta_abs_cw[ k ] [ i ] > 0 ) | |
| lmcs_delta_sign_cw_flag[ k ] [ i ] | u(1) |
| } | |
| } | |
| } | |
| ... | |

Several variants are described for the first embodiment, however, all of the different variants can be combined and interchanged to provide further variants.

According to a second embodiment, when the content is in RGB format and adaptive color transform is enabled, the chroma residual scaling is applied to the differential components (Cg, Co) resulting from the ACT. In the second embodiment, the adaptive color transform is enabled.

In fifth variant, when the content is 4:4:4 RGB, the chroma residual scaling is enabled at the picture or sequence, or picture, or slice level, and ACT is enabled for the coding unit, chroma residual scaling can be applied to the differential components (Cg, Co) resulting from the ACT (transform).

Figure 6:
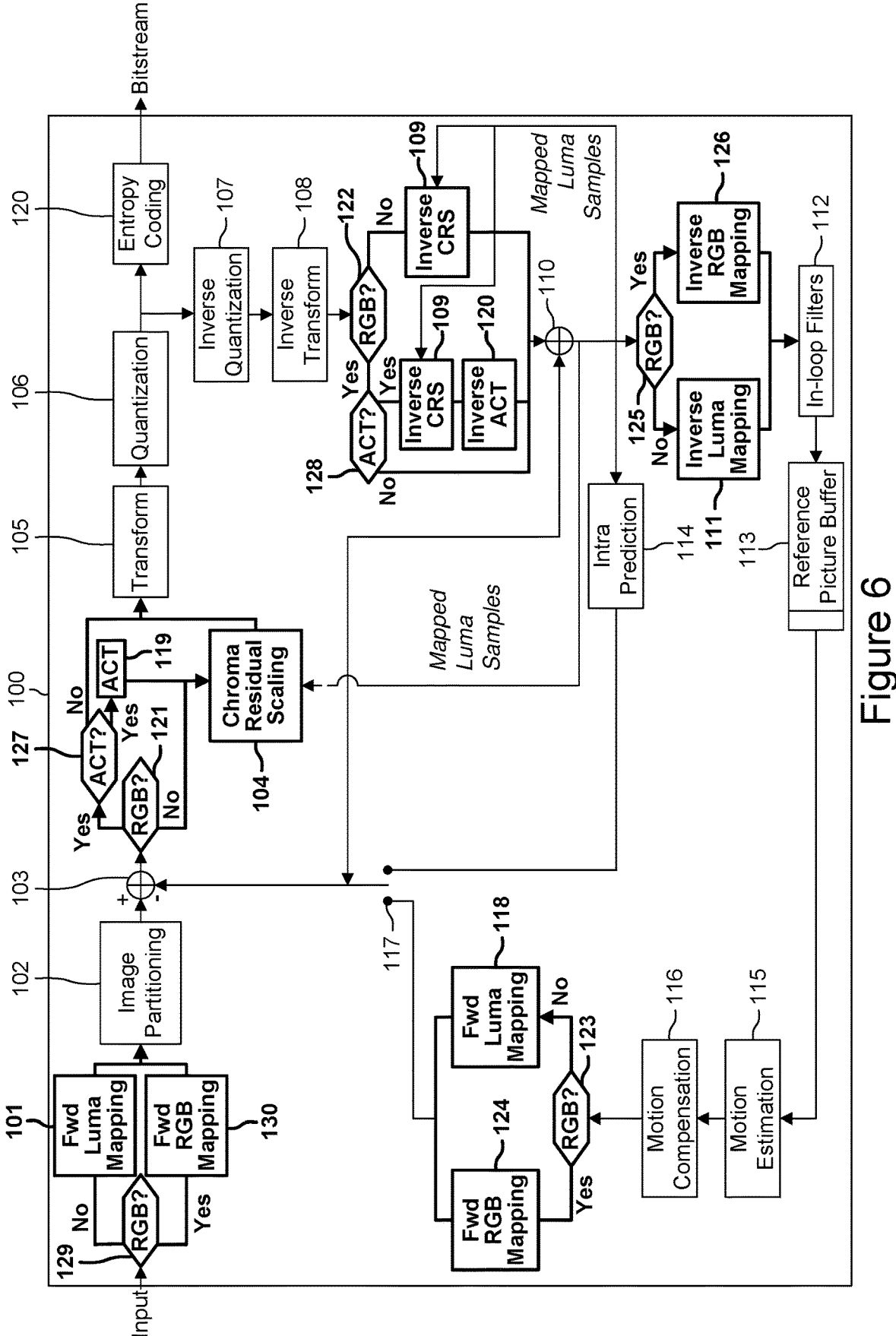
FIG. 6 illustrates a block diagram of an embodiment of video encoder with modified forward and inverse chroma residual scaling process according to at least one embodiment.

FIG. 6 illustrates a block diagram of an embodiment of video encoder with modified forward and inverse chroma residual scaling process according to at least one second embodiment. Compared with FIG. 4, two processes are modified for adapting the Chroma Residual Scaling. First changes concern the processes/blocks between steps/blocks 103 and 105. Second changes concern the processes/blocks between steps/blocks 108 and 110.

After step 103, the prediction residual is processed as follows. The format RGB or not RGB is tested (121). If the signal is not RGB, chroma residual scaling applies (104). If the signal is RGB (121) and ACT mode is enabled (127), ACT is applied (119) then chroma residual scaling applies to the Cg and Co components of the residual (104). If the signal is RGB (121) and ACT mode is disabled (127), neither ACT nor chroma residual scaling are applied. The resulting residual is the input of the transform step (105).

After step 108, the decoded residual is processed as follows. It is checked if the signal is RGB or not (122). If the signal is not RGB, inverse chroma residual scaling applies (109). If the signal is RGB and ACT mode is enabled, inverse chroma residual scaling (109) then inverse ACT (120) are applied. If the signal is RGB and ACT mode is disabled, neither inverse ACT nor inverse chroma residual scaling are applied. The resulting residual is the input of the "add" step (110).

Figure 7:
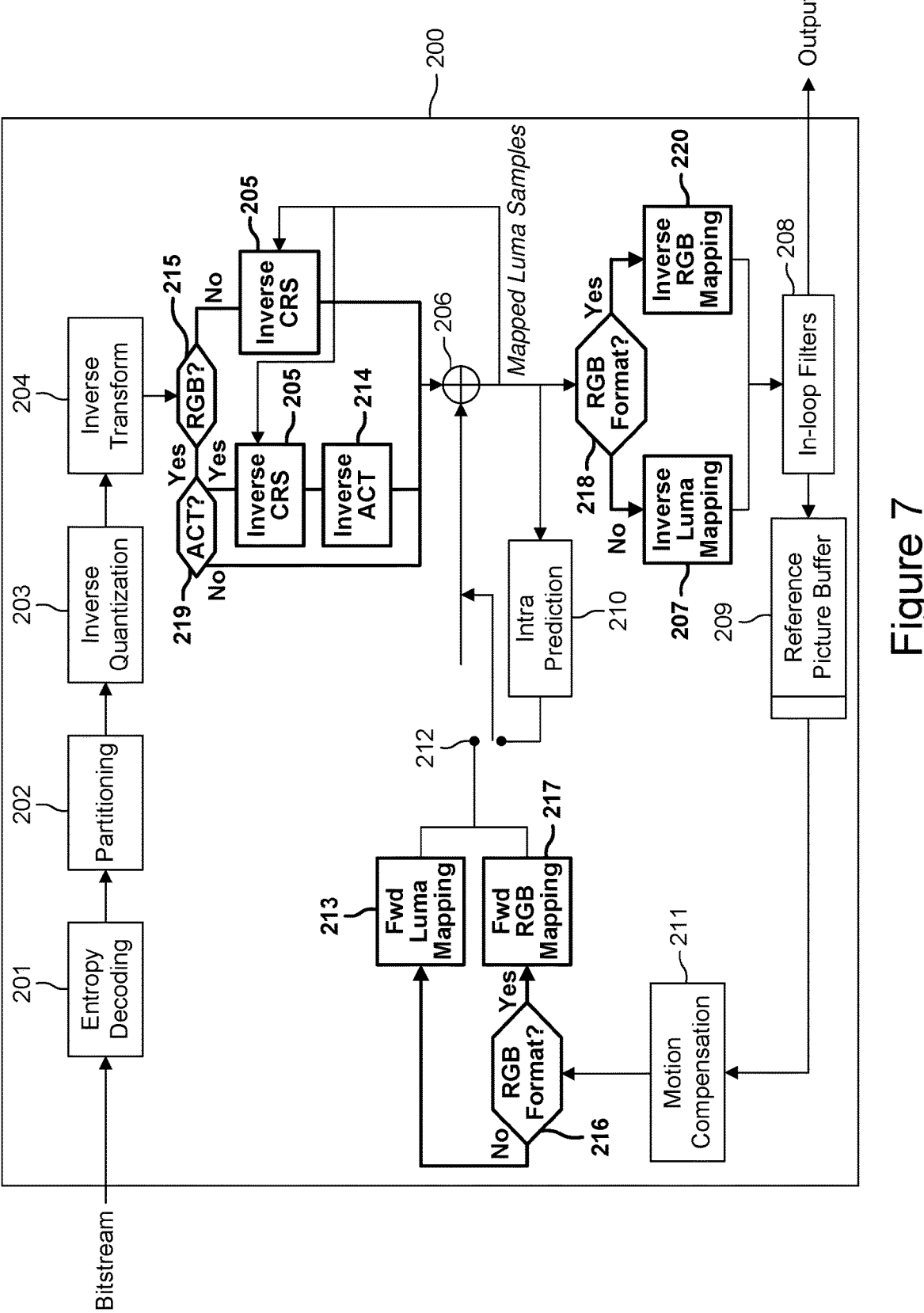
FIG. 7 illustrates a block diagram of an embodiment of video decoder with modified forward and inverse chroma residual scaling process according to at least one embodiment.

FIG. 7 illustrates a block diagram of an embodiment of video decoder with modified forward and inverse chroma residual scaling process according to at least one embodiment.

Compared with FIG. 5, the additional modified part is between steps/blocks 204 and 206. After step 204, the decoded residual is processed as follows. It is checked if the signal is RGB or not (215). If the signal is not RGB, inverse chroma residual scaling applies (205). If the signal is RGB (215) and ACT mode is enabled (219), inverse chroma residual scaling (205) then inverse ACT (214) are applied. If the signal is RGB (215) and ACT mode is disabled (219), neither inverse ACT nor inverse chroma residual scaling are applied. The resulting processing residual is the input of the "add" step (206).

This embodiment impacts the LMCS syntax, as shown in 5, highlighted in grey. The syntax elements related to CRS are only signaled when ACT is enabled at sequence level.

TABLE 5

| LMCS syntax table | |
|---|---|
| | Descriptor |
| lmcs_data( ) { | |
| lmcs_min_bin_idx | ue(v) |
| lmcs_delta_max_bin_idx | ue(v) |
| lmcs_delta_cw_prec_minus1 | ue(v) |
| for( i = lmcs_min_bin_idx; i <= LmcsMaxBinIdx; i++ ) { | |
| lmcs_delta_abs_cw[ i ] | u(v) |
| if( lmcs_delta_abs_cw[ i ] > 0 ) | |
| lmcs_delta_sign_cw_flag[ i ] | u(1) |
| } | |

TABLE 5-continued

| LMCS syntax table | |
|---|---|
| | Descriptor |
| if( aps_chroma_present_flag&& sps_act_enabled_flag) { | |
|    lmcs_delta_abs_crs | u(3) |
|    if( lmcs_delta_abs_crs > 0 ) | |
|       lmcs_delta_sign_crs_flag | u(1) |
|   } | |
| } | |

Advantageously, this fifth variant is compatible with the third or fourth variant where more than one mapping functions are used. Accordingly, one syntax element lmcs_crs_ reference is also added to indicate the reference mapping function that is used to derive the chroma scaling function used in CRS. This parameter can take values 0, 1 or 2. When the signal is RGB, and the luma mapping is applied to R,G, and B components, and when ACT is applied, it is then possible to apply CRS to the Co and Cg components residual resulting from ACT. In addition, when the RGB mapping is based on different mapping functions, it is needed to indicate which function is used for building the CRS scaling function to be applied to the Co and Cg components. The syntax element lmcs_crs_reference provides this indication. Table 6 shows the proposed change:

TABLE 6

| LMCS syntax table | |
|---|---|
| | Descriptor |
| lmcs_data( ) { | |
|   if( sps_chroma_format_idc = = 3 ) | |
|     lmcs_multiple_models_flag | u(1) |
|   for( k = 0; k <= 3 * lmcs_multiple_models_flag; k++ ) { | |
|     lmcs_min_bin_idx[ k ] | ue(v) |
|     lmcs_delta_max_bin_idx[ k ] | ue(v) |
|     lmcs_delta_cw_prec_minus1[ k ] | ue(v) |
|     for( i = lmcs_min_bin_idx[ k ]; i <= LmcsMaxBinIdx[ k ]; i++ ) { | |
|       lmcs_delta_abs_cw[ k ] [ i ] | u(v) |
|       if( lmcs_delta_abs_cw[ k ] [ i ] > 0 ) | |
|         lmcs_delta_sign_cw_flag[ k ] [ i ] | u(1) |
|     } | |
|   } | |
|   if( aps_chroma_present_flag && sps_act_enabled_flag ) { | |
|     if( lmcs_multiple_models_flag = = 3 ) | |
|       lmcs_crs_reference | u(2) |
|     lmcs_delta_abs_crs | u(3) |
|     if( lmcs_delta_abs_crs > 0 ) | |
|       lmcs_delta_sign_crs_flag | u(1) |
|   } | |
| } | |

When the chroma residual scaling applies, the following variants are considered for deriving the scaling factor.

In a sixth variant, the scaling factor is derived from samples from one of the R, G, or B components. Accordingly, in a non-limiting example, the index cIdx of the used component is signaled in the LMCS syntax (among values 0, 1 and 2). Accordingly, in another non-limiting example, the used component is defined by default, preferably the component of index 0. Then, considering cIdx specifying the index of color component used for deriving the scaling factor from any of the above non-limiting examples, the scaling factor is derived as follows: A representative value avgC of the samples of color component cIdx is derived, for instance as the average of the samples of the color component cIdx surrounding the VPDU containing the current CU. Then the scaling factor is derived as:

$$scale=scalingTable[avgC]$$

In a seventh variant, the scaling factor is derived from a luma value derived from the RGB reconstructed samples. Accordingly, in a non-limiting example, a representative value avgY of the RGB samples is derived, for instance as the average avgR, avgG, avgB of the RGB samples surrounding the VPDU containing the current CU. Then an average Y value avgY is derived using the RGB-to-YCgCo transform as follows:

$$avgY=(2*avgG+avgB+avgR)/4$$

then the scaling factor is derived as $$scale=scalingTable[avgY]$$

In another non-limiting example of the seventh variant, each RGB samples required for deriving the scaling factor, as for instance the RGB samples surrounding the VPDU containing the current CU are processed by the RGB-to-YCgCo transform as follows:

$$Y=(2*G+B+R)/4$$

then the Y values of the RGB samples required for deriving the scaling factor are averaged to get avgY. Finally, the scaling factor is derived as $$scale=scalingTable[avgY].$$

Figure 8:
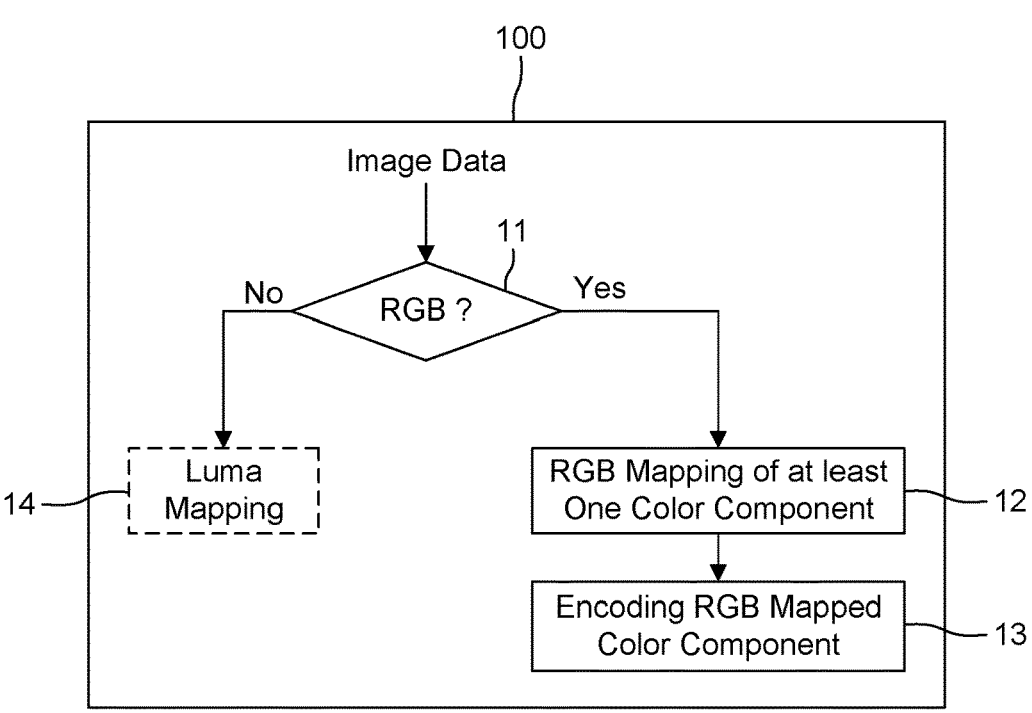
FIG. 8 illustrates a generic encoding method according to a general aspect of at least one embodiment.

FIG. 8 illustrates a generic encoding method (100) according to a general aspect of at least one embodiment.

The block diagram of FIG. 8 partially represents modules of
an encoder or encoding method, for instance implemented in
the exemplary encoder of FIG. 4 or of FIG. 6. According to
a generic embodiment a method for encoding 100 is dis-
closed. The method comprises determining (11) that a for-
mat of an image data of a video to encode is RGB format and
responsively applying a RGB mapping (12) to at least one of
the color components of the image data. Advantageously, a
RGB mapping adjusts the dynamic range of a color com-
ponent of an image data in RGB format and any of the
variants disclosed above regarding the enabling of the
mapping process, the one or more mapping function(s), the
enabling or disabling of the mapping per color components
are compatible with the generic method. Then, the video is
encoded (13) using the at least one RGB mapped color
component. In case the image data of a video to encode is
not RGB format, for instance YUV, then Luma mapping is
applied responsively to the enabling of the LMCS process as
known from VVC. Although not described here, the corre-
sponding forward mapping of the motion compensated
prediction and inverse mapping of the reconstructed samples
before in-loop filtering are further applied in the generic
method. According to another characteristic, not represented
on the FIG. 8, the method for encoding 100 further com-
prises determining that an adaptive color transform is
applied to the image data of a video to decode in RGB
format and responsively applying an adaptive color trans-
form to the image data resulting into differential color
components and applying a chroma residual scaling to the
differential color components (Cg, Co) of the image data
wherein a chroma residual scaling adjust the dynamic range
of a differential component of an image data.

Figure 9:
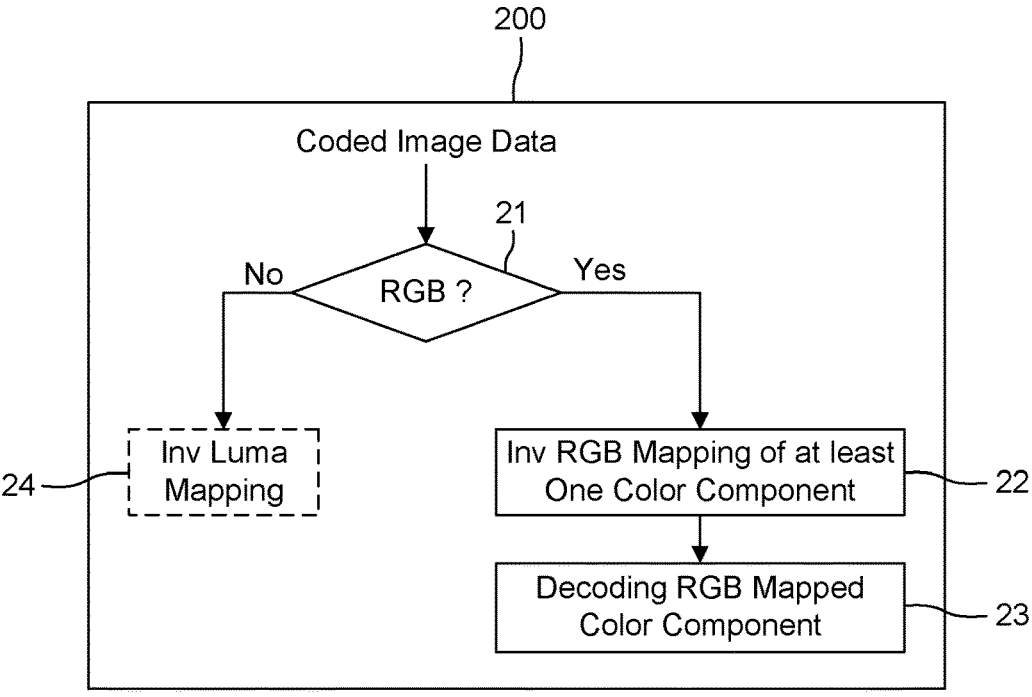
FIG. 9 illustrates a generic decoding method according to a general aspect of at least one embodiment.

FIG. 9 illustrates a generic decoding method (200)
according to a general aspect of at least one embodiment.
The block diagram of FIG. 8 partially represents modules of
a decoder or decoding method, for instance implemented in
the exemplary decoder of FIG. 5 or of FIG. 7. According to
a generic embodiment a method for decoding 200 is dis-
closed. The method comprises determining (21) that a
format of an image data of a video to encode is RGB format
and responsively applying an inverse RGB mapping (22) to
at least one of the color components of the image data.
Advantageously, at the encoder, a RGB mapping adjusts the
dynamic range of a color component of an image data in
RGB format and any of the variants disclosed above regard-
ing the enabling of the mapping process, the one or more
mapping function(s), the enabling or disabling of the map-
ping per color components are compatible with the generic
method. Thus, the video is decoded (23) using the at least
one inversed RGB mapped color component. In case the
image data of a video to encode is not RGB format, for
instance YUV, then inverse luma mapping is applied respon-
sively to the enabling of the LMCS process as known from
VVC. Although not described here, the corresponding for-
ward mapping of the motion compensated prediction used in
decoding is further applied in the generic method. According
to another characteristic, not represented on the FIG. 9, the
method for decoding (200) further comprises determining
that an adaptive color transform is applied to the image data
of a video to decode in RGB format and responsively
applying a chroma residual scaling to differential color
components (Cg, Co) wherein a chroma residual scaling
adjusts the dynamic range of a differential component and
applying an inverse adaptive color transform to the image
data.

Additional Embodiments and Information

This application describes a variety of aspects, including
tools, features, embodiments, models, approaches, etc.

Many of these aspects are described with specificity and, at
least to show the individual characteristics, are often
described in a manner that may sound limiting. However,
this is for purposes of clarity in description, and does not
limit the application or scope of those aspects. Indeed, all of
the different aspects can be combined and interchanged to
provide further aspects. Moreover, the aspects can be com-
bined and interchanged with aspects described in earlier
filings as well.

Figure 10:
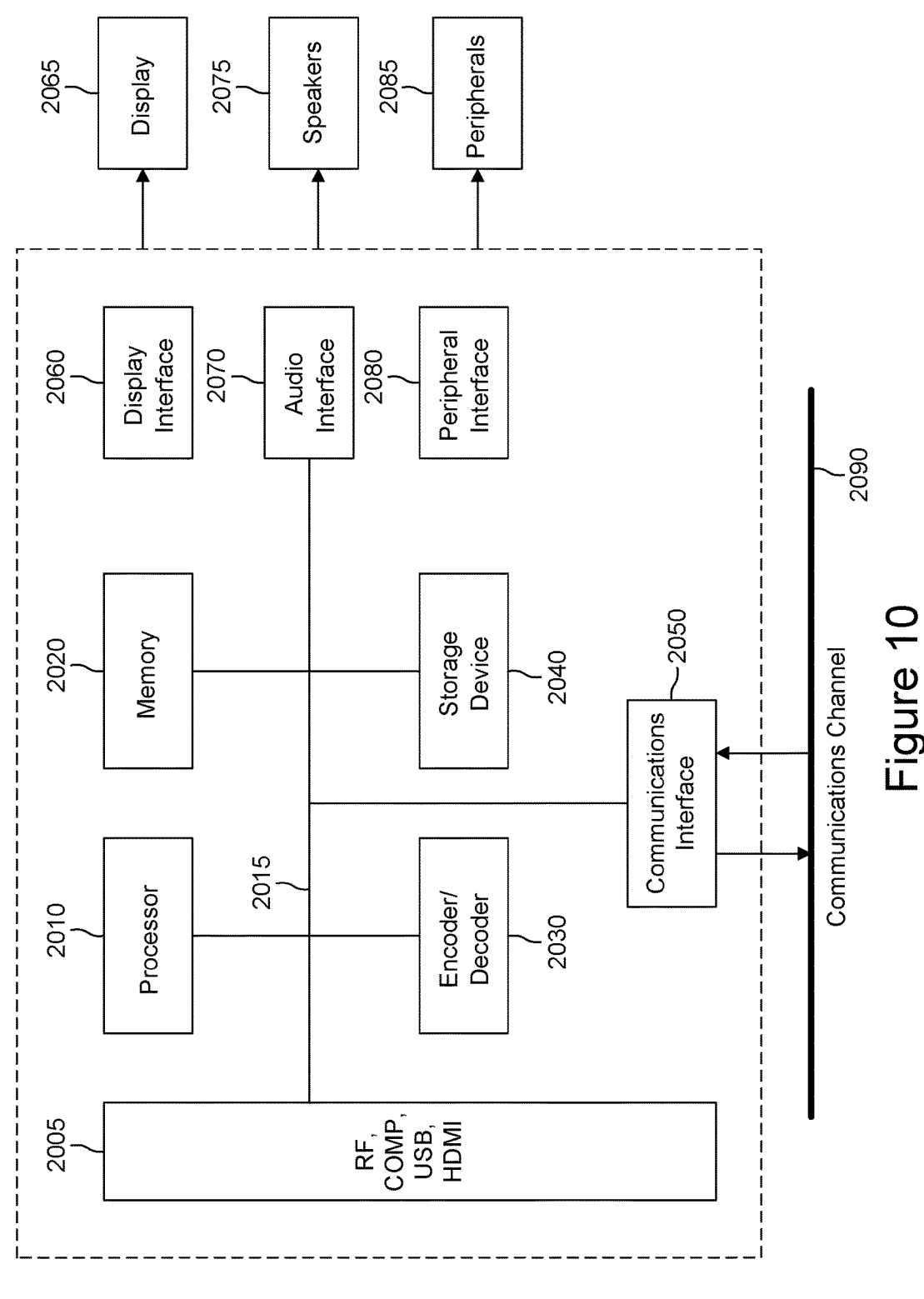
FIG. 10 illustrates a block diagram of an example apparatus in which various aspects of the embodiments may be implemented.

The aspects described and contemplated in this applica-
tion can be implemented in many different forms. FIG. 2,
FIG. 3 and FIG. 10 below provide some embodiments, but
other embodiments are contemplated and the discussion of
FIG. 2, FIG. 3 and FIG. 10 does not limit the breadth of the
implementations. At least one of the aspects generally
relates to video encoding and decoding, and at least one
other aspect generally relates to transmitting a bitstream
generated or encoded. These and other aspects can be
implemented as a method, an apparatus, a computer readable
storage medium having stored thereon instructions for
encoding or decoding video data according to any of the
methods described, and/or a computer readable storage
medium having stored thereon a bitstream generated accord-
ing to any of the methods described.

In the present application, the terms "reconstructed" and
"decoded" may be used interchangeably, the terms "pixel"
and "sample" may be used interchangeably, the terms
"image," "picture" and "frame" may be used interchange-
ably.

Various methods are described herein, and each of the
methods comprises one or more steps or actions for achiev-
ing the described method. Unless a specific order of steps or
actions is required for proper operation of the method, the
order and/or use of specific steps and/or actions may be
modified or combined. Additionally, terms such as "first",
"second", etc. may be used in various embodiments to
modify an element, component, step, operation, etc., such
as, for example, a "first decoding" and a "second decoding".
Use of such terms does not imply an ordering to the modified
operations unless specifically required. So, in this example,
the first decoding need not be performed before the second
decoding, and may occur, for example, before, during, or in
an overlapping time period with the second decoding.

Various methods and other aspects described in this
application can be used to modify modules, for example, the
forward luma mapping module, chroma residual scaling
module and corresponding inverse function modules (**101,
118, 104, 109, 111, 205, 207, 213), of a video encoder 100**
and decoder 200 as shown in FIG. 2 and FIG. 3. Moreover,
the present aspects are not limited to VVC or HEVC, and
can be applied, for example, to other standards and recom-
mendations, whether pre-existing or future-developed, and
extensions of any such standards and recommendations
(including VVC and HEVC). Unless indicated otherwise, or
technically precluded, the aspects described in this applica-
tion can be used individually or in combination.

Various numeric values are used in the present applica-
tion. The specific values are for example purposes and the
aspects described are not limited to these specific values.

FIG. 2 illustrates an encoder 100. Variations of this
encoder 100 are contemplated, but the encoder 100 is
described below for purposes of clarity without describing
all expected variations.

Before being encoded, the video sequence may go
through pre-encoding processing (101), for example, apply-
ing a color transform to the input color picture (e.g., con-
version from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (114). In an inter mode, motion estimation (115) and compensation (116) are performed. The encoder decides (117) which one of the intra mode or inter mode to use for encoding the unit, and indicates the intra/inter decision by, for example, a prediction mode flag. Prediction residuals are calculated, for example, by subtracting (103) the predicted block from the original image block.

The prediction residuals are then transformed (105) and quantized (106). The quantized transform coefficients, as well as motion vectors and other syntax elements, are entropy coded (120) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (107) and inverse transformed (108) to decode prediction residuals. Combining (110) the decoded prediction residuals and the predicted block, an image block is reconstructed. In-loop filters (112) are applied to the reconstructed picture to perform, for example, deblocking/SAO (Sample Adaptive Offset) filtering to reduce encoding artifacts. The filtered image is stored at a reference picture buffer (113).

FIG. 3 illustrates a block diagram of a video decoder 200. In the decoder 200, a bitstream is decoded by the decoder elements as described below. Video decoder 200 generally performs a decoding pass reciprocal to the encoding pass as described in FIG. 2. The encoder 100 also generally performs video decoding as part of encoding video data.

In particular, the input of the decoder includes a video bitstream, which can be generated by video encoder 100. The bitstream is first entropy decoded (201) to obtain transform coefficients, motion vectors, and other coded information. The picture partition information indicates how the picture is partitioned. The decoder may therefore divide (202) the picture according to the decoded picture partitioning information. The transform coefficients are de-quantized (203) and inverse transformed (204) to decode the prediction residuals. Combining (206) the decoded prediction residuals and the predicted block, an image block is reconstructed. The predicted block can be obtained (212) from intra prediction (210) or motion-compensated prediction (i.e., inter prediction) (211). In-loop filters (208) are applied to the reconstructed image. The filtered image is stored at a reference picture buffer (209). The decoded picture can further go through post-decoding processing (207), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 10 illustrates a block diagram of an example of a system in which various aspects and embodiments are implemented. System 2000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2000, singly or in combination, can be embodied in a single integrated circuit (IC), multiple ICs, and/or discrete components. For example, in at least one embodiment, the processing and encoder/decoder elements of system 2000 are distributed across multiple ICs and/or discrete components. In various embodiments, the system 2000 is communicatively coupled to one or more other systems, or other electronic devices, via, for example, a communications bus or through dedicated input and/or output ports. In various embodiments, the system 2000 is configured to implement one or more of the aspects described in this document.

The system 2000 includes at least one processor 2010 configured to execute instructions loaded therein for implementing, for example, the various aspects described in this document. Processor 2010 can include embedded memory, input output interface, and various other circuitries as known in the art. The system 2000 includes at least one memory 2020 (e.g., a volatile memory device, and/or a non-volatile memory device). System 2000 includes a storage device 2040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 2040 can include an internal storage device, an attached storage device (including detachable and non-detachable storage devices), and/or a network accessible storage device, as non-limiting examples.

System 2000 includes an encoder/decoder module 2030 configured, for example, to process data to provide an encoded video or decoded video, and the encoder/decoder module 2030 can include its own processor and memory. The encoder/decoder module 2030 represents module(s) that can be included in a device to perform the encoding and/or decoding functions.

As is known, a device can include one or both of the encoding and decoding modules. Additionally, encoder/decoder module 2030 can be implemented as a separate element of system 2000 or can be incorporated within processor 2010 as a combination of hardware and software as known to those skilled in the art.

Program code to be loaded onto processor 2010 or encoder/decoder 2030 to perform the various aspects described in this document can be stored in storage device 2040 and subsequently loaded onto memory 2020 for execution by processor 2010. In accordance with various embodiments, one or more of processor 2010, memory 2020, storage device 2040, and encoder/decoder module 2030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 2010 and/or the encoder/decoder module 2030 is used to store instructions and to provide working memory for processing that is needed during encoding or decoding. In other embodiments, however, a memory external to the processing device (for example, the processing device can be either the processor 2010 or the encoder/decoder module 2030) is used for one or more of these functions. The external memory can be the memory 2020 and/or the storage device 2040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 2000 can be provided through various input devices as indicated in block 2005. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 6, include composite video.

In various embodiments, the input devices of block 2005 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 2000 to other electronic devices across USB and/or HDMI connections. It is to be understood that various aspects of input processing, for example, Reed-Solomon error correction, can be implemented, for example, within a separate input processing IC or within processor 2010 as necessary. Similarly, aspects of USB or HDMI interface processing can be implemented within separate interface ICs or within processor 2010 as necessary. The demodulated, error corrected, and demultiplexed stream is provided to various processing elements, including, for example, processor 2010, and encoder/decoder 2030 operating in combination with the memory and storage elements to process the data stream as necessary for presentation on an output device.

Various elements of system 2000 can be provided within an integrated housing, Within the integrated housing, the various elements can be interconnected and transmit data therebetween using suitable connection arrangement 2015, for example, an internal bus as known in the art, including the Inter-IC (I2C) bus, wiring, and printed circuit boards.

The system 2000 includes communication interface 2050 that enables communication with other devices via communication channel 2090. The communication interface 2050 can include, but is not limited to, a transceiver configured to transmit and to receive data over communication channel 2090. The communication interface 2050 can include, but is not limited to, a modem or network card and the communication channel 2090 can be implemented, for example, within a wired and/or a wireless medium.

Data is streamed, or otherwise provided, to the system 2000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2090 and the communications interface 2050 which are adapted for Wi-Fi communications. The communications channel 2090 of these embodiments is typically connected to an access point or router that provides access to external networks including the Internet for allowing streaming applications and other over-the-top communications. Other embodiments provide streamed data to the system 2000 using a set-top box that delivers the data over the HDMI connection of the input block 2005. Still other embodiments provide streamed data to the system 2000 using the RF connection of the input block 2005. As indicated above, various embodiments provide data in a non-streaming manner. Additionally, various embodiments use wireless networks other than Wi-Fi, for example a cellular network or a Bluetooth network.

The system 2000 can provide an output signal to various output devices, including a display 2065, speakers 2075, and other peripheral devices 2085. The display 2065 of various embodiments includes one or more of, for example, a touchscreen display, an organic light-emitting diode (OLED) display, a curved display, and/or a foldable display. The display 2065 can be for a television, a tablet, a laptop, a cell phone (mobile phone), or other device. The display 2065 can also be integrated with other components (for example, as in a smart phone), or separate (for example, an external monitor for a laptop). The other peripheral devices 2085 include, in various examples of embodiments, one or more of a stand-alone digital video disc (or digital versatile disc) (DVR, for both terms), a disk player, a stereo system, and/or a lighting system. Various embodiments use one or more peripheral devices 2085 that provide a function based on the output of the system 2000. For example, a disk player performs the function of playing the output of the system 2000.

In various embodiments, control signals are communicated between the system 2000 and the display 2065, speakers 2075, or other peripheral devices 2085 using signaling such as AV.Link, Consumer Electronics Control (CEC), or other communications protocols that enable device-to-device control with or without user intervention. The output devices can be communicatively coupled to system 2000 via dedicated connections through respective interfaces 2065, 2075, and 2085. Alternatively, the output devices can be connected to system 2000 using the communications channel 2090 via the communications interface 2050. The display 2065 and speakers 2075 can be integrated in a single unit with the other components of system 2000 in an electronic device such as, for example, a television. In various embodiments, the display interface 2065 includes a display driver, such as, for example, a timing controller (T Con) chip.

The display 2065 and speaker 2075 can alternatively be separate from one or more of the other components, for example, if the RF portion of input 2005 is part of a separate set-top box. In various embodiments in which the display 2065 and speakers 2075 are external components, the output signal can be provided via dedicated output connections, including, for example, HDMI ports, USB ports, or COMP outputs.

The embodiments can be carried out by computer software implemented by the processor 2010 or by hardware, or by a combination of hardware and software. As a non-limiting example, the embodiments can be implemented by one or more integrated circuits. The memory 2020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 2010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, comprising an inverse RGB mapping of at least one RGB color component, the mapping adjusting the dynamic range of samples of an image data in RGB format.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, an RGB mapping of at least one RGB color component, the RGB mapping adjusting the dynamic range of samples of an image data in RGB format.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, LMCS parameters, lmcs_enable_flag, lmcs_multiple_models_flag are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into: a) SDP (session description protocol), a format for describing multimedia communication sessions for the purposes of session announcement and session invitation, for example as described in RFCs and used in conjunction with RTP (Real-time Transport Protocol) transmission; b) DASH MPD (Media Presentation Description) Descriptors, for example as used in DASH and transmitted over HTTP, a Descriptor is associated to a Representation or collection of Representations to provide additional characteristic to the content Representation; c) RTP header extensions, for example as used during RTP streaming, and/or d) ISO Base Media File Format, for example as used in OMAF and using boxes which are object-oriented building blocks defined by a unique type identifier and length also known as 'atoms' in some specifications.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for transform. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Adapting luma mapping to RGB format in the decoder and/or encoder.

Adapting chroma residual scaling to RGB format when ACT is enabled in the decoder and/or encoder.

Selecting a RGB mapping function to apply in the decoder and/or encoder.

Signaling an information relative to an enabling of a RGB mapping process to apply in the decoder.

Inserting in the signaling syntax elements that enable the decoder to identify the RGB mapping/inverse RGB mapping process to use, such as RGB piece wise linear parameters.

Selecting, based on these syntax elements, the at least one inverse RGB mapping process to apply at the decoder.

A bitstream or signal that includes one or more of the described syntax elements, or variations thereof.

A bitstream or signal that includes syntax conveying information generated according to any of the embodiments described.

Inserting in the signaling syntax elements that enable the decoder to that enable the decoder to identify the RGB mapping/inverse RGB mapping process to use, such as RGB piece wise linear parameters, in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs a mapping process adapted to RGB format according to any of the embodiments described.

A TV, set-top box, cell phone, tablet, or other electronic device that performs a a mapping process adapted to RGB format according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs a a mapping process adapted to RGB format according to any of the embodiments described.

A TV, set-top box, cell phone, tablet, or other electronic device that receives (e.g. using an antenna) a signal over the air that includes an encoded image, and performs a a mapping process adapted to RGB format according to any of the embodiments described.

The invention claimed is:

1. A method for video decoding, comprising:

determining that a format of an image data of a video to decode is RGB format with a 4:4:4 chroma sampling structure;

responsively applying an inverse in-loop RGB mapping to at least one of the color components of the image data, wherein an RGB mapping adjusts a dynamic range of a color component of the image data in RGB format, wherein the in-loop RGB mapping is a luma mapping configured to adjust the dynamic range of one or more of the R. G, or B color components of the image data in the RGB format with a 4:4:4 chroma sampling structure; and decoding the video based on the at least one inverse RGB mapped color component.

2. The method of claim 1, further comprising:

determining that an in-loop adaptive color transform is applied to the image data of a video to decode in RGB format, the adaptive color transform resulting into differential color components; and responsively applying an inverse in-loop chroma residual scaling to differential color components wherein a chroma residual scaling adjusts the dynamic range of a differential component of an image data and applying an inverse adaptive color transform to the image data.

3. The method of claim 1, wherein an inverse RGB mapping is applied to all of the color components of the image data.

4. An apparatus for video decoding, comprising one or more processors, wherein the one or more processors are configured to:

determine that a format of an image data of a video to decode is RGB format with a 4:4:4 chroma sampling structure;

apply an inverse in-loop RGB mapping to at least one of the color components of the image data wherein an RGB mapping adjusts a dynamic range of a color component of the image data in RGB format, wherein the in-loop RGB mapping is a luma mapping configured to adjust the dynamic range of one or more of the R, G, or B color components of the image data in the RGB format with a 4:4:4 chroma sampling structure; and decode the video based on the at least one inverse RGB mapped color component.

5. The apparatus of claim 4, wherein the one or more processors are further configured to:

determine that an in-loop adaptive color transform is applied to the image data of a video to decode in RGB format, the adaptive color transform resulting into differential color components; and apply an inverse in-loop chroma residual scaling to differential color components wherein a chroma residual scaling adjusts the dynamic range of a differential component of an image data and applying an inverse adaptive color transform to the image data.

6. The apparatus of claim 4, wherein an inverse RGB mapping is applied to all of the color components of the image data.

7. A method for video encoding, comprising:

determining that a format of an image data of a video to encode is RGB format with a 4:4:4 chroma sampling structure;

responsively applying an in-loop RGB mapping to at least one of the color components of the image data wherein an RGB mapping adjusts a dynamic range of a color component of the image data in RGB format, wherein the in-loop RGB mapping is a luma mapping configured to adjust the dynamic range of one or more of the R, G, or B color components of the image data in the RGB format with a 4:4:4 chroma sampling structure; and encoding the video based on the at least one RGB mapped color component.

8. The method of claim 7, further comprising:

determining that an in-loop adaptive color transform is applied to the image data of a video to decode in RGB format, the adaptive color transform resulting into differential color components; and responsively applying an inverse in-loop chroma residual scaling to differential color components wherein a chroma residual scaling adjusts the dynamic range of a differential component of an image data and applying an inverse adaptive color transform to the image data.

9. The method of claim 7, wherein an inverse RGB mapping is applied to all of the color components of the image data.

10. An apparatus for video encoding, comprising one or more processors, wherein the one or more processors are configured to:

determine that a format of an image data of a video to encode is RGB format with a 4:4:4 chroma sampling structure;

responsively apply an in-loop RGB mapping to at least one of the color components of the image data wherein the in-loop RGB mapping adjusts a dynamic range of a color component of an image data in RGB format, wherein the in-loop RGB mapping is a luma mapping configured to adjust the dynamic range of the R. G. or B color components of the image data in the RGB format with a 4:4:4 chroma sampling structure; and encode the video based on the at least one RGB mapped color component.

11. The apparatus of claim 10, wherein the one or more processors are further configured to:

determine that an in-loop adaptive color transform is applied to the image data of a video to decode in RGB format, the adaptive color transform resulting into differential color components; and apply an inverse in-loop chroma residual scaling to differential color components wherein a chroma residual scaling adjusts the dynamic range of a differential component of an image data and applying an inverse adaptive color transform to the image data.

12. The apparatus of claim 10, wherein an inverse RGB mapping is applied to all of the color components of the image data.

13. A non-transitory computer readable medium containing instructions for performing the method of claim 1, when executed by one or more processors.

14. A non-transitory computer readable medium containing instructions for performing the method of claim 7, when executed by one or more processors.

15. A non-transitory computer readable medium containing data content encoded thereupon by:

determining that a format of an image data of the data content to encode is RGB format with a 4:4:4 chroma sampling structure;

responsively applying an in-loop RGB mapping to at least one of the color components of the image data wherein the in-loop RGB mapping adjusts a dynamic range of a color component of an image data in RGB format, wherein the in-loop RGB mapping is a luma mapping configured to adjust the dynamic range of one or more of the R.G. or B color components of the image data in the RGB format with a 4:4:4 chroma sampling structure; and encoding the data content based on the at least one RGB mapped color component.

16. The non-transitory computer readable medium of claim 15, wherein encoded data content further comprises at least one syntax data element specifying that the in-loop RGB mapping is enabled for all of the color components.

17. The non-transitory computer readable medium of claim 15, wherein encoded data content further comprises at least one syntax data element specifying that an in-loop adaptive color transform is applied to the image data in RGB format, the adaptive color transform resulting into differential color components.

\* \* \* \* \*